US012665817B2

(12) United States Patent
Delayen

(10) Patent No.: US 12,665,817 B2
(45) Date of Patent: Jun. 23, 2026

(54) SYSTEMS AND METHODS FOR MAPPING DEVICE FAILURES IN A NETWORK

(71) Applicant: OVH, Roubaix (FR)

(72) Inventor: Florent Delayen, Roubaix (FR)

(73) Assignee: OVH, Roubaix (FR)

( * ) Notice: Subject to any disclaimer, the term of this patent is extended or adjusted under 35 U.S.C. 154(b) by 196 days.

(21) Appl. No.: 18/746,241

(22) Filed: Jun. 18, 2024

(65) Prior Publication Data

US 2024/0422071 A1     Dec. 19, 2024

(30) Foreign Application Priority Data

Jun. 19, 2023    (EP) .................................... 23305972

(51) Int. Cl.
 *H04L 41/14* (2022.01)
 *H04L 41/0663* (2022.01)
 *H04L 41/0686* (2022.01)

(52) U.S. Cl.
 CPC ........ *H04L 41/145* (2013.01); *H04L 41/0663* (2013.01); *H04L 41/0686* (2013.01)

(58) Field of Classification Search
 CPC ............... H04L 41/145; H04L 41/0663; H04L 41/0686; H04L 41/5058; H04L 41/065; H04L 41/0677
 USPC ....................................................... 709/224
 See application file for complete search history.

(56) References Cited

U.S. PATENT DOCUMENTS

| | | | | |
|---|---|---|---|---|
| 11,316,728 | B2 * | 4/2022 | Gerstel ............... | H04L 43/0811 |
| 2017/0155544 | A1 * | 6/2017 | Khanna ................... | H04L 41/12 |
| 2020/0145283 | A1 * | 5/2020 | Zeng ................... | H04L 43/0817 |
| 2021/0152416 | A1 * | 5/2021 | A ........................ | H04L 41/0631 |
| 2022/0286348 | A1 * | 9/2022 | Han .................... | H04L 41/0677 |
| 2023/0216747 | A1 * | 7/2023 | Barber ................... | H04L 41/16 |
| | | | | 709/224 |

OTHER PUBLICATIONS

European Search Report with regard to European Patent Application No. 23305972.4 completed Nov. 10, 2023.
Sanchez et al., "Self-Modeling based Diagnosis of Services over Programmable Networks", IEEE, 2016, pp. 277-285.

* cited by examiner

*Primary Examiner* — Karen C Tang
(74) *Attorney, Agent, or Firm* — BCF LLP

(57) ABSTRACT

There is disclosed a method and system for identifying the effects of an item failing in a network. Information about a first item in a network is received. The information indicates that the first item provides a service to other items in the network. A graph of the network is retrieved. A node in the graph that corresponds to the first item is identified. Edges are added to the graph to connect the node of the first item to nodes of the other items that receive the service from the first item. A request is received to model a failure of the first item. The nodes connected to the node that corresponds to the first item are retrieved. Operational rules are applied to each of the retrieved nodes to identify if any of their corresponding items would fail. A list of items that would fail is output.

20 Claims, 6 Drawing Sheets

300

Power unit
301

Power unit
302

Cooling system
303

Router
304

Router
305

Incident
323

Server
310

Server
311

Email service
320

Website
321

Website
322

350

351

352

353

354

355

356

357

358

359

360

SYSTEMS AND METHODS FOR MAPPING DEVICE FAILURES IN A NETWORK

CROSS-REFERENCE TO RELATED APPLICATIONS

The present application claims priority to EP Patent Application No. 23305972.4, filed with the European Patent Office on Jun. 19, 2023, entitled "Systems and Methods for Mapping Device Failures in a Network," which is incorporated herein by reference in its entirety.

FIELD

The present technology relates to systems and methods for generating a graph of items in a network and determining the effects of an item in the network failing.

BACKGROUND

A network may include various hardware and software components, such as switches, servers, virtual machines, cooling hardware, power supplies, etc. A configuration management database (CMDB) may be used to store information about these hardware and software components. In the event of a failure of some of the hardware or software components, the CMDB may be consulted to determine how to manage the failure.

The CMDB may contain information on thousands or millions of items. As the amount of items in the CMDB increases, the complexity of identifying relationships between items and predicting the effects of a failure increase. In order to properly respond to a failure it may be critical to identify relationships quickly, which might not be possible with a large CMDB.

It is an object of the present technology to ameliorate at least some of the limitations present in the prior art.

SUMMARY

Implementations of the present technology have been developed based on developers' appreciation of shortcomings associated with the prior art.

According to a first broad aspect of the present technology, there is provided a method comprising: receiving information about a first item in a network, wherein the information comprises an identifier of the first item and an indication that the first item provides a service to one or more second items in the network; retrieving a graph corresponding to the network; determining whether any node in the graph corresponds to the identifier of the first item; after determining that the graph does not contain any node corresponding to the first item, adding a first node to the graph corresponding to the first item in the network; adding one or more edges to the graph connecting the first node to one or more second nodes corresponding to the one or more second items, wherein each edge indicates that the first item provides the service to the one or more second items; receiving a request to model a failure of the first item; retrieving the one or more second nodes that are connected to the first node by edges; determining, by applying one or more operational rules to each of the one or more second nodes, whether any items corresponding to the one or more second nodes would fail because of the offline item; and outputting one or more items that would fail because of the failure of the first item.

In some implementations of the method, the method further comprises: determining a first set of nodes corresponding to the one or more items that will fail; identifying all nodes in the graph that are connected by an edge to the first set of nodes; generating a second set of nodes comprising the nodes in the graph that are connected to the first set of nodes; determining, by applying the one or more operational rules to each node of the second set of nodes, whether any items corresponding to the second set of nodes would fail because of the offline item; and outputting one or more items corresponding to the second set of nodes that would fail because of the failure of the first item.

In some implementations of the method, the graph is a directed graph.

In some implementations of the method, the first item in the network is a hardware component.

In some implementations of the method, the first item in the network is a software service.

In some implementations of the method, the information about the first item comprises a model number and a manufacturer of the first item.

In some implementations of the method, the information about the first item comprises a list of attributes of the first item.

In some implementations of the method, the first node comprises a type of the first item, a unique identifier corresponding to the first item, and one or more attributes of the first item.

In some implementations of the method, each edge indicates a type of service provided by the first node to the one or more second nodes and one or more attributes of the service.

In some implementations of the method, determining whether any items corresponding to the one or more second nodes would fail because of the offline item comprises, for each node of the one or more second nodes: determining a type of an item associated with the respective node; retrieving, based on the type, one or more operational rules to be applied to the respective node; and applying the one or more operational rules to the respective node to determine whether the item associated with the respective node would continue operating after the first item has failed.

In some implementations of the method, the method further comprises: determining that the first item has failed; and re-routing traffic in the network away from the one or more items that would fail because of the failure of the first item.

In some implementations of the method, the method further comprises: adding an incident node to the graph; and adding an edge to the graph connecting the incident node to the first node.

In some implementations of the method, the method further comprises: determining that an incident that caused the failure of the first item has been resolved; removing the incident node from the graph; and removing any edges connected to the incident node from the graph.

According to another broad aspect of the present technology, there is provided a system for modeling a failure of an item in a network, the system comprising a controller and a memory storing a plurality of executable instructions which, when executed by the controller, cause the system to: receive information about a first item in the network, wherein the information comprises an identifier of the first item and an indication that the first item provides a service to one or more second items in the network; retrieve a graph corresponding to the network; determine whether any node in the graph corresponds to the identifier of the first item;

after determining that the graph does not contain any node corresponding to the first item, add a first node to the graph corresponding to the first item in the network; add one or more edges to the graph connecting the first node to one or more second nodes corresponding to the one or more second items, wherein each edge indicates that the first item provides the service to the one or more second items; receive a request to model a failure of the first item; retrieve the one or more second nodes that are connected to the first node by edges; determine, by applying one or more operational rules to each of the one or more second nodes, whether any items corresponding to the one or more second nodes would fail because of the offline item; and output one or more items that would fail because of the failure of the first item.

According to another broad aspect of the present technology, there is provided non-transitory computer-readable medium comprising computer-readable instructions that, upon being executed by a system, cause the system to receive information about a first item in a network, wherein the information comprises an identifier of the first item and an indication that the first item provides a service to one or more second items in the network; retrieve a graph corresponding to the network; determine whether any node in the graph corresponds to the identifier of the first item; after determining that the graph does not contain any node corresponding to the first item, add a first node to the graph corresponding to the first item in the network; add one or more edges to the graph connecting the first node to one or more second nodes corresponding to the one or more second items, wherein each edge indicates that the first item provides the service to the one or more second items; receive a request to model a failure of the first item; retrieve the one or more second nodes that are connected to the first node by edges; determine, by applying one or more operational rules to each of the one or more second nodes, whether any items corresponding to the one or more second nodes would fail because of the offline item; and output one or more items that would fail because of the failure of the first item.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
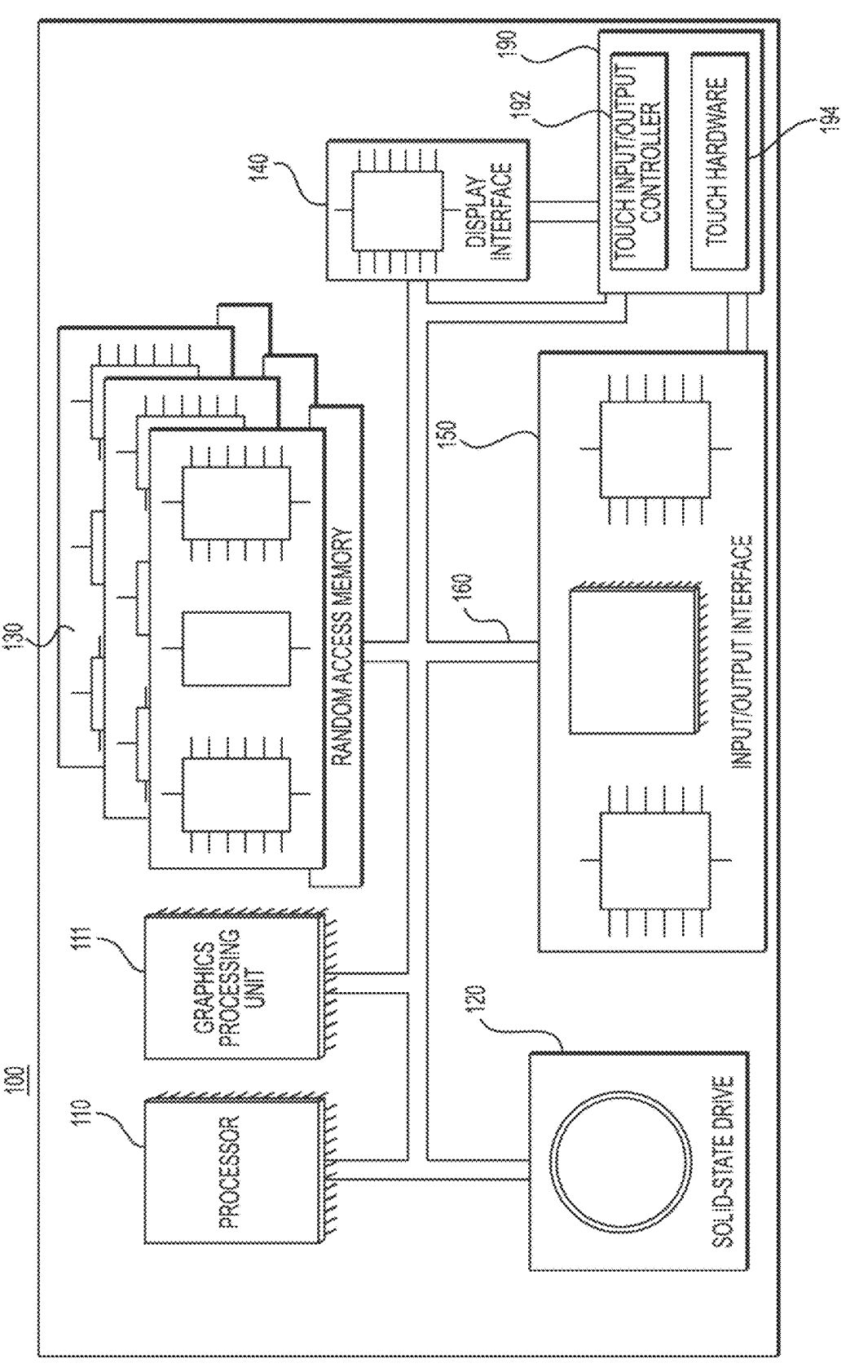
FIG. 1 is a block diagram of an example computing environment in accordance with various embodiments of the present technology.

It should be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and/or implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some implementations of the present technology, the processor may be a general purpose processor, such as a central processing unit (CPU) or a processor dedicated to a specific purpose, such as a digital signal processor (DSP) or quantum processing unit (QPU). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof.

In the context of the present specification, unless expressly provided otherwise, a computer system may refer, but is not limited to, an "electronic device," an "operation system," a "system," a "computer-based system," a "controller unit," a "monitoring device," a "control device," and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first," "second," "third," etc. have been used as adjectives only for the purpose of allowing for distinction between the nouns that they modify from one another, and not for the purpose of describing any particular relationship between those nouns.

With these fundamentals in place, we will now consider some non-limiting examples of the present technology.

Computing Environment

FIG. 1 illustrates a computing environment 100, which may be used to implement and/or execute any of the methods described herein. In some embodiments, the computing environment 100 may be implemented by any of a conventional personal computer, a network device, and/or an electronic device (such as, but not limited to, a mobile device, a tablet device, a server, a controller unit, a control device, etc.), and/or any combination thereof appropriate to the relevant task at hand.

In some embodiments, the computing environment 100 comprises various hardware components including one or more single or multi-core processors collectively represented by processor 110, a solid-state drive 120, a random access memory 130, and an input/output interface 150. The computing environment 100 may be a computer specifically designed to operate a machine learning algorithm (MLA). The computing environment 100 may be a generic computer system.

In some embodiments, the computing environment 100 may also be a subsystem of one of the above-listed systems. In some other embodiments, the computing environment 100 may be an "off-the-shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Those skilled in the art will appreciate that processor 110 is generally representative of a processing capability. In some embodiments, in place of or in addition to one or more conventional Central Processing Units (CPUs), one or more specialized processing cores may be provided. For example, one or more Graphic Processing Units 111 (GPUs), Quantum Processing Units (QPUs), Tensor Processing Units (TPUs), and/or other so-called accelerated processors (or processing accelerators) may be provided in addition to or in place of one or more CPUs.

System memory will typically include random access memory 130, but is more generally intended to encompass any type of non-transitory system memory such as static random access memory (SRAM), dynamic random access memory (DRAM), synchronous DRAM (SDRAM), read-only memory (ROM), or a combination thereof. Solid-state drive 120 is shown as an example of a mass storage device, but more generally such mass storage may comprise any type of non-transitory storage device configured to store data, programs, and other information, and to make the data, programs, and other information accessible via a system bus 160. For example, mass storage may comprise one or more of a solid state drive, hard disk drive, a magnetic disk drive, and/or an optical disk drive.

Communication between the various components of the computing environment 100 may be enabled by a system bus 160 comprising one or more internal and/or external buses (e.g., a PCI bus, universal serial bus, IEEE 1394 "Firewire" bus, SCSI bus, Serial-ATA bus, ARINC bus, etc.), to which the various hardware components are electronically coupled.

The input/output interface 150 may enable networking capabilities such as wired or wireless network communications. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example the networking interface may implement specific physical layer and data link layer standards such as Ethernet, Fibre Channel, Wi-Fi, Token Ring or Serial communication protocols. The specific physical layer and the data link layer may provide a base for a full network protocol stack, allowing communication among small groups of computers on the same local area network (LAN) and large-scale network communications through routable protocols, such as Internet Protocol (IP).

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the computing environment 100 in addition to or instead of the touchscreen 190.

According to some implementations of the present technology, the solid-state drive 120 stores program instructions suitable for being loaded into the random access memory 130 and executed by the processor 110 for executing acts of one or more methods described herein. For example, at least some of the program instructions may be part of a library or an application.

The computing environment 100 may include any number of the illustrated components, which may be integrated in any number of physical devices. The computing environment 100 may be implemented as a cloud environment and/or a distributed architecture. The computing environment 100 may include multiple servers, which may be in different physical locations and/or on different networks. The computing environment 100 may include virtualized systems. The methods described herein, or any parts of the methods described herein, may be executed on multiple systems as distributed applications.

System for Mapping Items a Network

Figure 2:
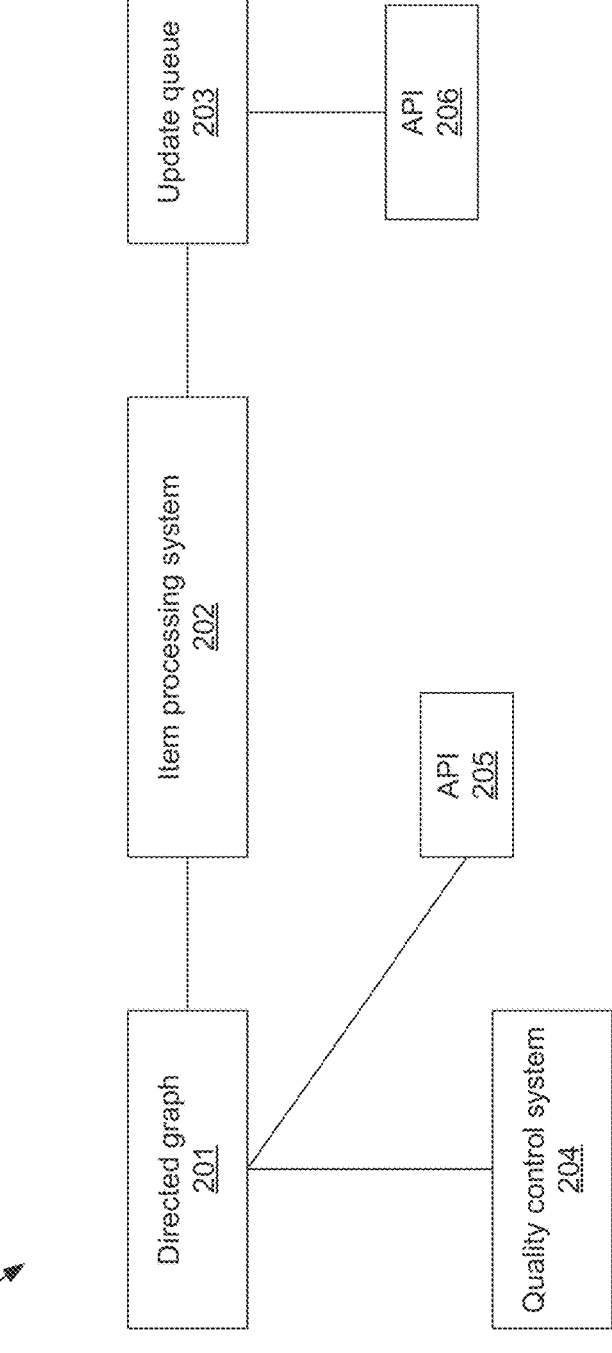
FIG. 2 is a block diagram of a system for generating a directed graph of items in a network in accordance with various embodiments of the present technology.

FIG. 2 is a block diagram of a system 200 for generating a directed graph of items in a network in accordance with various embodiments of the present technology. Updates regarding items may be received in an update queue 203. The updates may include any information regarding items. An update may include a description of an item that has been added to the network, an item that has been removed from the network, a modification to an existing item in the network, and/or any other information.

Each update may include a unique identifier (UID) of an item in the network. The unique identifier may be a string of numbers and/or letters. The UID may be assigned by a network administrator. Each item that is added to the network may be assigned a UID.

The update may include a data model identifier that identifies a type of the item, such as a load balancer, battery, router, database, and/or any other type of item. The update may include attributes of the item. The update may include a manufacturer and/or model number of the item. Each type of item may have an associated set of attributes. For example for a battery, the attributes may include a voltage, peak current, operating temperature, internal resistance, etc.

An update may include a list of related items. The related items may be items that provide a service to the item or receive a service from the item. The related items may be identified by their UIDs. The type of relationship may be identified.

The updates in the update queue 203 may describe any types of items, such as hardware items, software services, and/or any other components. Although described herein as items in a network, it should be understood that the items can be in a single network, multiple networks, and/or not in any network. Any types of items may be modeled using the systems and methods described herein. The items may be referred to as "configuration items" (CIs).

Updates may be added to the update queue via an application programming interface (API) 206. Each time an item in the network is added, removed, or modified, the API 206 may be used to add an update to the update queue 203.

The updates in the update queue 203 may be fetched by an item processing system 202. The item processing system 202 may then apply the update to a directed graph 201. After fetching an update from the update queue 203, the item processing system 202 may determine whether the update includes a new item or an item that already exists in the directed graph 201. If the item is new, the item processing system 202 may generate a new node in the directed graph 201. The new node may include the UID of the item, attributes of the item, an item type of the item, and/or any other information regarding the item. The item processing system 202 may generate edges in the directed graph 201 connecting the node with other nodes in the directed graph 201. The edges may represent the relations of the item to other items in the network. The edges may indicate which items in the network the item provides services to and/or which items in the network the item receives services from.

If the update describes an item that already exists in the directed graph 201, the item processing system 202 may determine whether any changes should be made to the directed graph 201 based on the update, such as by adding or removing edges, modifying attributes of an edge, modifying attributes of a node, and/or performing any other modifications on the directed graph 201. The item processing system 202 may then modify the directed graph 201 based on the update.

After an update has been applied to the directed graph 201, the update may be removed from the update queue 203. The item processing system 202 may continue fetching updates from the update queue 203, and applying those updates to the directed graph 201.

Each time an item is added to the network, removed from the network, or modified, an update may be added to the update queue 203 and then applied to the directed graph 201 by the item processing system 202. By continuously updating the information in the directed graph 201, the directed graph 201 may contain up-to-date information about every item in the network. Although described as a directed graph 201, it should be understood that the information about the items may be stored in any other type of data structure, such as an undirected graph, a database, etc.

An API 205 may be used to access the information stored in the directed graph 201. The API 205 may be able to read and/or write to the directed graph 201. The API 205 may provide access control to the directed graph 201 by limiting which users are able to access the directed graph 201. The API 205 may provide some users with read-only access to the directed graph 201 and other users with read and write access to the directed graph 201. The API 205 may limit the amount of queries sent to the directed graph 201. The API 205 may provide a standardized route for users and/or software to import and/or update data in the directed graph 201.

A quality control system 204 may verify the data stored in the directed graph 201. The quality control system 204 may monitor the directed graph 201 to identify data that appears to be incorrect, outdated, and/or otherwise erroneous. Nodes and/or edges in the directed graph 201 that appear to be problematic may be flagged by the quality control system 204 for further review. The quality control system 204 may be able to automatically correct suspected errors in the directed graph 201, such as by querying the items corresponding to the flagged nodes and/or edges. Each time a node or edge is added to the directed graph 201 or modified in the directed graph 201, the quality control system 204 may analyze the attributes of the node or edge to determine whether there are any inconsistencies. The quality control system 204 may have rules for each of the node types, edge types, and/or different attributes. For example, when a node is added to the directed graph 201, the node may have an IP address attribute, and the quality control system 204 may have various rules to determine whether the IP address of the node is a valid IP address. If the node fails any of the rules, the quality control system 204 may attempt to correct the error and/or flag the error for correction.

Graph of Items

Figure 3:
FIG. 3 illustrates a graph of items in a network in accordance with various embodiments of the present technology.

FIG. 3 illustrates a graph 300 of items in a network in accordance with various embodiments of the present technology. The graph 300 illustrated in FIG. 3 is an example of a directed graph 201. The graph 300 includes nodes (illustrated as circles) and edges. Each node represents an item. Each edge represents a relationship between items.

The graph 300 includes a power unit 301 and a power unit 302. The edge 350 indicates that the power unit 301 provides a service (power) to a server 310. Similarly, the edge 351 indicates that the power unit 302 provides power to the server 310. The edges 350 and 351 may include attributes describing the service, such as a maximum amount of power provided by the respective power units 301 and 302. A cooling system 303 provides cooling to the server 310, as indicated by the edge 352. A router 304 provides networking services to the server 310, as indicated by the edge 353, and provides networking service to a server 311, as indicated by the edge 354. A router 305 also provides networking service to the server 311, as indicated by the edge 355.

The server 310 provides hosting for various services, including an email service 320 as indicated by the edge 356, a website 321 as indicated by the edge 357, and a website 322 as indicated by the edge 358. The website 322 is also hosted by the server 311, as indicated by the edge 359.

As can be seen in the graph 300, some of the nodes have redundant services, while others do not. For example the website 322 is hosted by two servers, the server 310 and the server 311, whereas the website 321 is only hosted by a single server, the server 310.

The graph 300 can be used to model failures in the network. For example, if the router 304 fails, this may cause the server 310 to fail, which may in turn cause the email service 320 to fail and the website 321 to fail. In this example, the server 311 may continue functioning properly, because the server 311 can still access networking services via the router 305. Similarly, the website 322 may continue functioning, despite the fact that the failure of the router 304 has caused the server 310 to fail, because the website 322 is also hosted by the server 311, which continues to function despite the failure of the router 304.

Incidents that have caused items in the network to fail may be included in the graph 300. The incident node 323 indicates, via the edge 360, that the router 305 has failed. The failure of the router 305 may cause other items in the graph 300 to fail, such as the server 311 and website 322. These other items may be identified using the method 500, described below and in FIGS. 5 and 6. The incident node 323, as illustrated, points to the root cause of the incident, which is the failure of the router 305. In some instances the incident node 323 may have edges connected to all items that have failed due to the incident, such as an edge pointing to the server 311 and/or website 322. After the incident corresponding to the incident node 323 has been resolved, the incident node 323 and the edge 360 may be removed from the graph 300.

Operational rules may be used to determine whether an item will continue functioning or not after a failure has occurred in the network. The operational rules may be specific to a device type. The operational rules may include any number of rules for determining whether an item will continue functioning. The operational rules may define a minimum amount of services for an item to continue functioning. For example, operational rules for a server may indicate that a server will continue functioning if it has at least one cooling system, at least two power units, and at least one router.

Updating the Graph of Items

Figure 4:
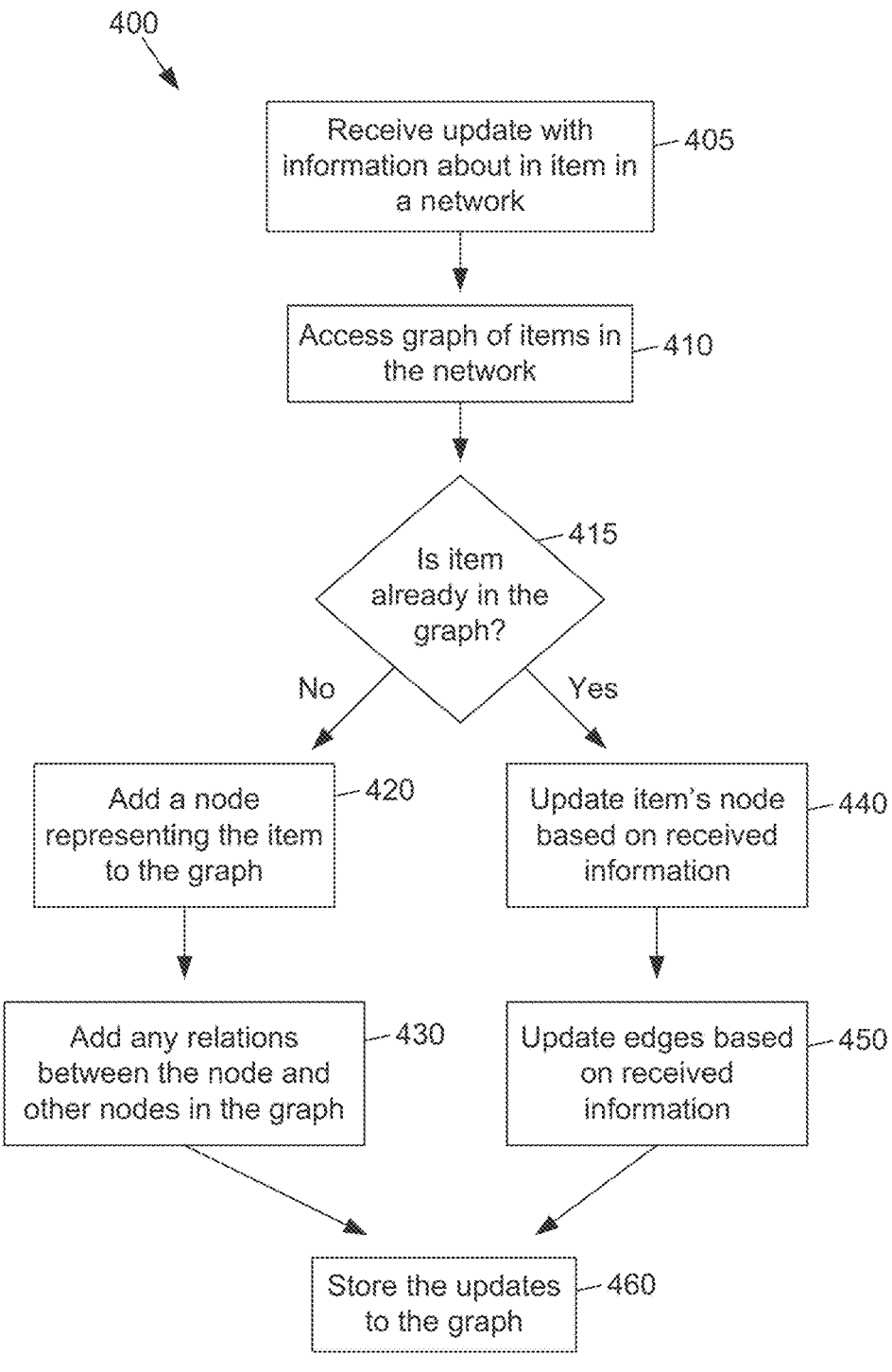
FIG. 4 is a flow diagram of a method for updating the graph of items in the network in accordance with various embodiments of the present technology.

FIG. 4 is a flow diagram of a method 400 for updating the graph of items in the network in accordance with various embodiments of the present technology. All or portions of the method 400 may be executed by any of the devices illustrated in FIG. 2, such as the item processing system 202, and/or any other device in the system 200. In one or more aspects, the method 400 or one or more steps thereof may be performed by a computing system, such as the computing environment 100. The method 400 or one or more steps thereof may be embodied in computer-executable instructions that are stored in a computer-readable medium, such as a non-transitory mass storage device, loaded into memory and executed by a CPU. The method 400 is exemplary, and it should be understood that some steps or portions of steps in the flow diagram may be omitted and/or changed in order.

At step 405 an update may be received with information about an item in a network. The information may include a description of an item that has been added to the network, a description of a modification to an existing item in the network, a description of an item that has been removed from the network, and/or any other information about an item in the network. The received information may be placed in a queue of updates, such as the update queue 203. The update may have been received via an API, such as the API 206.

The update may have been generated by the item described in the update. When an item is connected to the network, the item may automatically send the update. After a change is made to an item, the item may send an update that includes the description of the change. The update may include just a description of the change or a full description of all attributes and/or relations for the item. Items in the network may be configured to periodically send an update, such as a weekly update to confirm that the item is still active in the network.

As described above, each update may include a unique identifier (UID) of an item in the network, a data model identifier that identifies a type of the item, attributes of the item, a list of related items, a relationship type for each of the relations, attributes for the relations, and/or any other information about the item. The update may include information about any type of item in the network, including hardware and/or software.

At step 410 a graph of items in the network may be accessed. The graph may be the directed graph 201. The graph may contain a description of each item in the network. Each item in the network may be represented as a node in the graph. Relationships in the network may be represented as edges in the graph, where an edge connecting two nodes indicates a relationship between the two items represented by the nodes. The edges may point from the node that provides the service and point to the node that receives the service.

At step 415 a the graph may be queried to determine whether a node already exists in the graph that corresponds to the item described in the update received at step 405. The graph may be searched for a node with the UID of the item referred to in the update. If the node already exists in the graph, the method 400 may proceed to step 440 to update the existing node. Otherwise, if a node corresponding to the item does not yet exist in the graph, the method 400 may proceed to the step 420 to add a new node to the graph.

At step 420 a new node may be added to the graph. The node may contain a description of the item, such as the UID of the item, the data model identifier of the item, attributes of the item, and/or any other information regarding the item.

At step 430 edges may be added to the graph to represent relationships between the node and any other nodes in the graph. The update received at step 405 may include information about a relationship between the item described in the update and another item in the network. The update may include the UID and/or any other identifier of the other item in the relationship, a type of service associated with the relationship, and/or any other information about the relationship. A node in the graph that corresponds to the other item may be identified, such as by querying the graph for the UID of the other item. If there is no existing node in the graph for the other item, a node may be added to the graph to represent the other item. An edge may be added connecting the node to the other node. The edge may indicate a type of the relationship, attributes of the relationship, and/or any other information about the relationship between the two nodes. A direction of the edge may indicate which of the nodes is providing the service and which of the nodes is receiving the service. The edge may point from the node that provides the service to the node that receives the service.

As described above, if a node corresponding to the item in the update received at step 405 is found in the graph at step 415, the method 400 may proceed to step 440. At step 440 the node may be updated based on the received information. The node may be retrieved from the graph. Information stored in the node may be compared to the information in the update received at step 405. If any information about the item associated with the node has changed, the node may be updated to reflect those changes. For example, if an attribute of the item has changed, the stored value for that attribute in the node may be changed to reflect the change to the item.

At step 450 edges may be updated based on the received information. If the item has any new relationships, edges may be added to represent those relationships. If the received information indicates a modification to an existing relationship, the edge associated with that relationship may be retrieved and modified to represent the changes. If a relationship between the item and another item no longer exists, the edge associated with that relationship may be removed from the graph.

After the graph has been updated via steps 420 and 430 or 440 and 450, the method 400 may proceed to step 460. At step 460 the updates to the graph may be stored. The updates to the graph may be stored by applying queries and/or commands to the graph. The graph may be accessed via an API, in which case the API is used to modify the graph as determined at steps 420 and 430 or 440 and 450.

Modeling Item Failure

Figure 5:
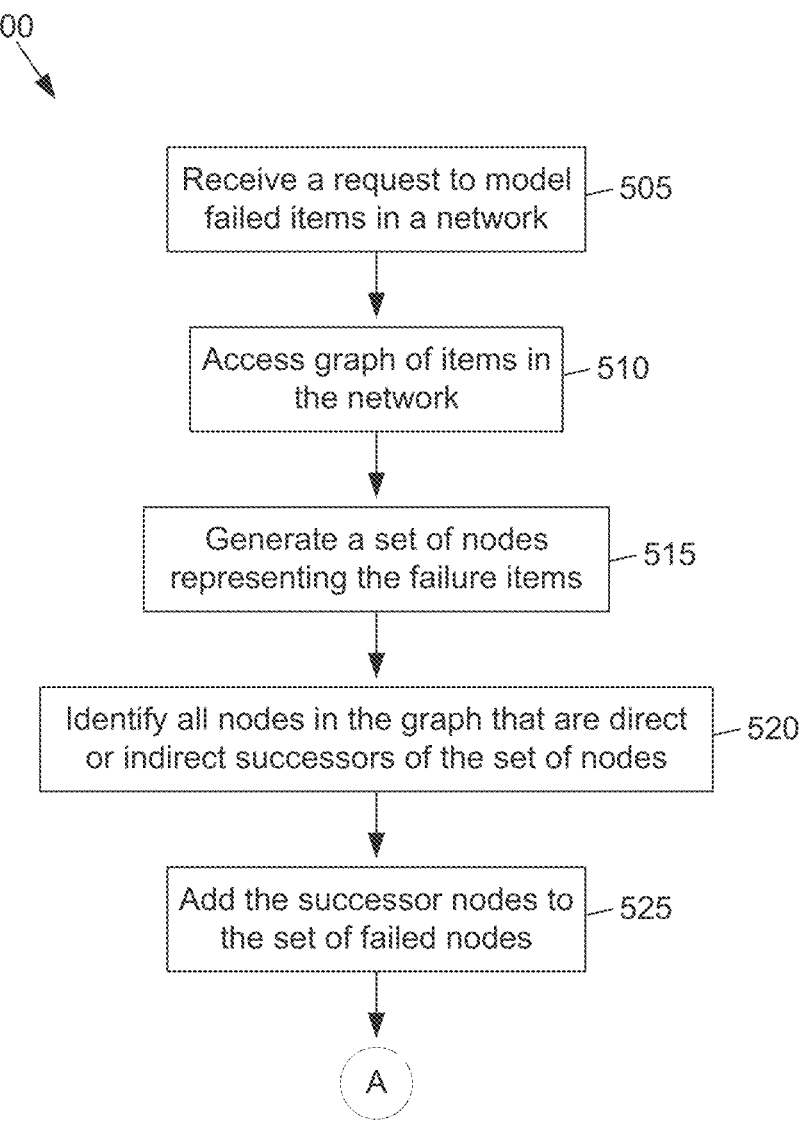
FIGS. 5 and 6 are a flow diagram of a method for modeling a failure of an item in the network in accordance with various embodiments of the present technology.
Figure 6:
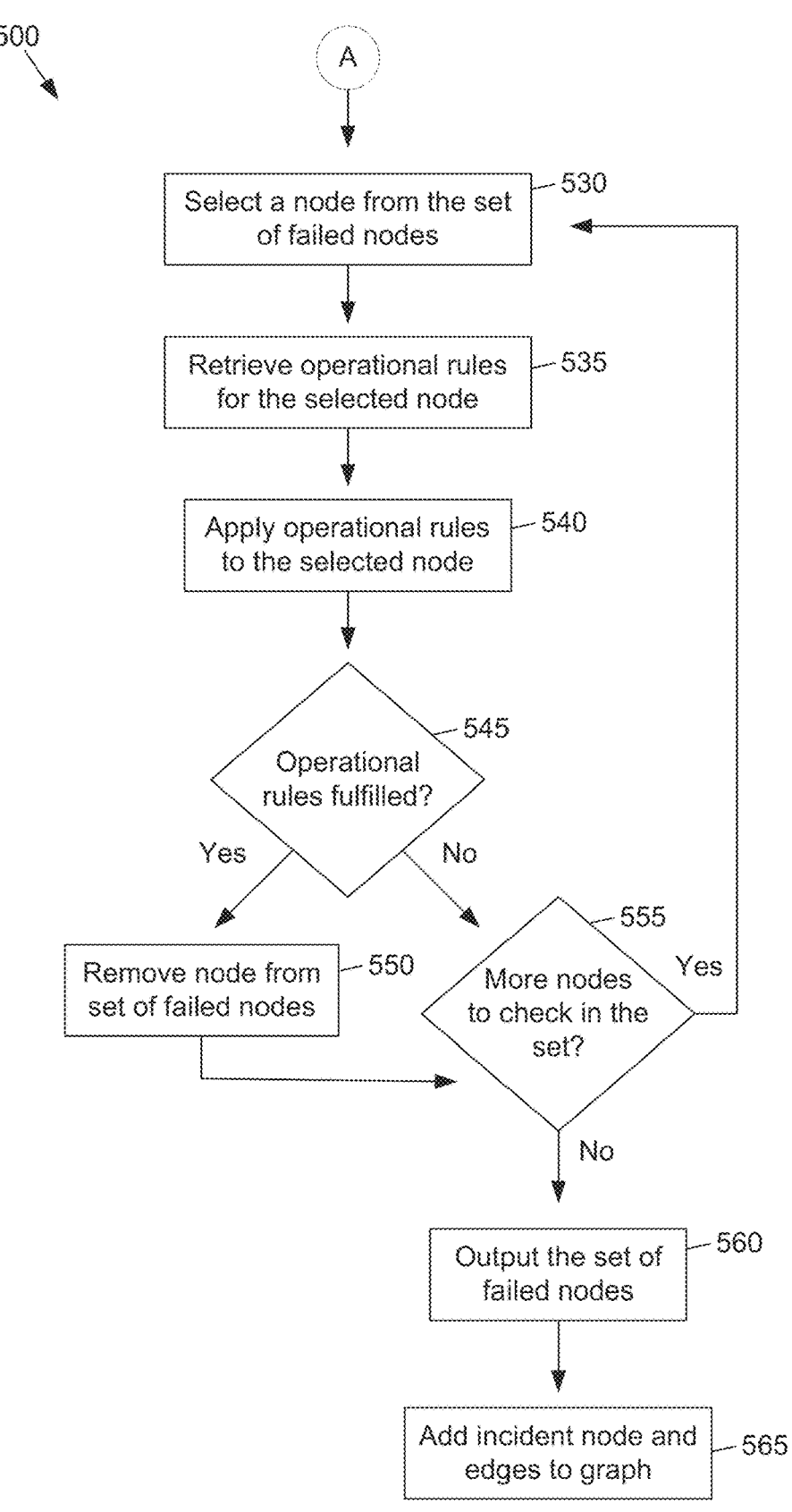

FIGS. 5 and 6 are a flow diagram of a method 500 for modeling a failure of an item in the network in accordance with various embodiments of the present technology. All or portions of the method 500 may be executed by any of the devices illustrated in FIG. 2. In one or more aspects, the method 500 or one or more steps thereof may be performed by a computing system, such as the computing environment 100. The method 500 or one or more steps thereof may be embodied in computer-executable instructions that are stored in a computer-readable medium, such as a non-transitory mass storage device, loaded into memory and executed by a CPU. The method 500 is exemplary, and it should be understood that some steps or portions of steps in the flow diagram may be omitted and/or changed in order.

At step 505 a request may be received to model failed items in a network. The request may include a UID or other identifier of each failed item. The request may be received after detecting that the items have failed, such as after detecting that the items have gone offline, are not functioning properly, and/or are otherwise malfunctioning. The request may be received prior to the items failing, such as to determine the impact of a failure. The request may be to model the failure of a single item in the network or multiple items in the network. The items may be hardware items, software items, and/or any other type of items.

The request may include one or more existing failed nodes and/or edges in the network. The existing failed nodes and/or edges may represent items and/or services that should be considered failed when modeling the failed items. These items and/or services may have been detected to be offline. The existing failed nodes and/or edges may have been previously stored and may then be retrieved. A system may monitor the network to identify any items and/or services that are offline. After detecting that an item and/or service is offline, the system may store an indicator that the node and/or edge corresponding to the item and/or service is offline.

At step 510 the graph of items in the network may be accessed. The graph may be accessed by querying the graph, via an API, by retrieving the graph, and/or through any other method for accessing the graph. The graph may be a directed graph, such as the directed graph 201. Actions performed at step 510 may be similar to those performed at step 410 of the method 400.

At step 515 all of the nodes associated with the failed items may be identified. A single node may be identified for each of the failed items. The node may contain the UID of the failed item. The nodes may be formed into a set, placed in a queue, and/or otherwise organized together. If existing failed nodes and/or edges were received and/or retrieved at step 505, the existing failed nodes and/or edges may be added to the set of failed items.

At step 520 all successors of the nodes identified at step 515 may be identified. All of the nodes in the graph representing items that receive a service from the failed items may be identified. For each node in the set generated at step 515, the edges connected to the node and that are directed away from the node may be retrieved and the nodes connected to those edges may be identified. For example, in the graph illustrated in FIG. 3, if the router 304 is a failed item, then the server 310 and server 311 would be identified at step 520.

Indirect successors of the failed nodes may also be identified. Indirect successors are items that receive a service from an item that receives a service from the failed node. Any number of intervening nodes may be between the failed node and an indirect successor. In the example graph illustrated in FIG. 3, if the router 304 is a failed item, the server 310 and server 311 would be direct successors of the failed node, and the email service 320, website 321, and website 322 would be indirect successors. Each of these nodes may be identified at step 520 as successor nodes. The nodes identified at step 520 are nodes that are at risk of failing due to the failure of the failed nodes.

At step 525 the successor nodes identified at step 520 may be added to the set of failed nodes. Existing failed nodes related to any of the nodes in the set of failed nodes may be identified by searching the graph for incident nodes related to these nodes. As described above, an incident node has edges pointing to failed nodes that are the cause of the incident. After the incident is resolved, the incident nodes and the edges may be removed from the graph. All incident nodes related to the items in the set of failed nodes may be retrieved.

At step 530 a node may be selected from the set of failed nodes. The nodes may be selected from the set of failed nodes in any order, such as first-in-first-out, last-in-first-out, random, and/or any other order.

At step 535 operational rules for the selected node may be retrieved. The type of the item associated with the selected node may be determined. The selected node may store the item type. Each of the operational rules may indicate an item type or multiple item types that the operational rules apply to. Operational rules corresponding to the item type of the selected node may be identified. The operational rules may be stored in a database and/or any other type of data structure. The operational rules that apply to the item type of the node may be identified by querying the database. For example if the selected node has an item type of "switch," all operational rules that apply to switches may be retrieved.

At step 540 the retrieved operational rules may be applied to the selected node to determine whether the selected node satisfies the operational rules. The operational rules may indicate a minimum amount of services for the node to continue operating. For example the operational rules may indicate that a router should have at least one functioning power source to remain online. The operational rules may indicate a minimum amount of an attribute for the node to continue operating. For example, for a load balancer the operating rules may indicate that the load balancer uses 20 Amps of power. This operating rule may be satisfied by a single power supply that supplies 20 Amps, or multiple power supplies that together supply 20 Amps in total. In another example, for a server, the operational rules may indicate that the server should have an active link with at least one load balancer. If the number of active links between the server and load balancers is greater than one, the node may be considered operational. Otherwise, if the node has no active link to a load balancer, the rule may be considered breached and the node considered not operational.

The graph may be used to determine whether the operational rules are satisfied or not. The edges and nodes that are connected to the selected node may be retrieved and used to determine whether the operational rules are satisfied. The edges and nodes connected to the selected node may indicate which services are available to the selected node. Nodes that are in the set of failed nodes might not be considered when applying the operational rules, as those nodes represent items that may be offline. Nodes that are failed due to an incident might not be considered when applying the operational rules, as those nodes represent items that may be offline. The nodes that are failed due to an incident may be identified using incident nodes in the graph. At step 545 a determination may be made as to whether the operational rules were satisfied.

The edges of each node that is connected to the selected node may be retrieved to determine whether the node is connected to any incident nodes. If the node is connected to any incident nodes, that node may be considered a failed node. The failed nodes might not be used when applying the operational rules.

If any of the operational rules were not satisfied, that may indicate that the item represented by the selected node would fail if the failure indicated at step 505 occurred. If a determination is made at step 545 that one or more operational rules were not satisfied, the selected node may be considered a failed node, and the method 500 may proceed to step 555. Because the selected node is considered a failed node, the selected node is kept in the set of failed nodes.

If all of the operational rules were satisfied, the method 500 may continue to step 550. The item associated with the selected node may be considered to be operational and removed from the set of failed nodes. After removing the selected node from the set of failed nodes, the method 500 may continue to step 555.

At step 555 the set of failed nodes may be checked to determine if there are any additional nodes that have not had the operational rules applied to them at step 545. If additional nodes remain to check, the method 500 may proceed to step 530 and another node may be selected from the set of failed nodes. Otherwise the method 500 may proceed to step 560 where an output is generated based on the set of failed nodes. The output may indicate which items in the network would fail. The output may indicate, for each failed item, a reason for the failure. The reason for the failure may include a description of which operational rules were not satisfied and/or which operational rules were satisfied. The list of items that would fail may be transmitted to an operator, so that the operator can determine which items in the network are likely to fail.

At step 565 an incident node may be added to the graph. Edges may be added to the graph that point from the incident node to each of the failed nodes in the set of failed nodes. After the incident has been resolved, the incident node and associated edges may be removed from the graph.

After determining that an item has failed in a network, the method 500 may be used to determine the other items in the network that will be affected by the failure. The network may be reconfigured to compensate for the failed items. Packets may be redirected to avoid the failed items in the network. Traffic in the network may be re-routed away from the items corresponding to the set of failed nodes.

While some of the above-described implementations may have been described and shown with reference to particular acts performed in a particular order, it will be understood that these acts may be combined, sub-divided, or re-ordered without departing from the teachings of the present technology. At least some of the acts may be executed in parallel or in series. Accordingly, the order and grouping of the act is not a limitation of the present technology.

It should be expressly understood that not all technical effects mentioned herein need be enjoyed in each and every embodiment of the present technology.

As used herein, the wording "and/or" is intended to represent an inclusive-or; for example, "X and/or Y" is intended to mean X or Y or both. As a further example, "X, Y, and/or Z" is intended to mean X or Y or Z or any combination thereof.

The foregoing description is intended to be exemplary rather than limiting. Modifications and improvements to the above-described implementations of the present technology may be apparent to those skilled in the art.

The invention claimed is:

1. A method comprising:

receiving information about a first item in a network, wherein the information comprises an identifier of the first item and an indication that the first item provides a service to one or more second items in the network;

retrieving a graph corresponding to the network;

determining whether any node in the graph corresponds to the identifier of the first item;

after determining that the graph does not contain any node corresponding to the identifier of the first item, adding a first node to the graph corresponding to the first item in the network;

adding one or more edges to the graph connecting the first node to one or more second nodes corresponding to the one or more second items, wherein each edge indicates that the first item provides the service to the one or more second items;

receiving a request to model a failure of the first item;

retrieving the one or more second nodes that are connected to the first node by edges;

determining, by applying one or more operational rules to each of the one or more second nodes, whether any items corresponding to the one or more second nodes would fail because of the failure of the first item; and outputting one or more items that would fail because of the failure of the first item;

adding an incident node to the graph;

adding an edge to the graph connecting the incident node to the first node;

determining that an incident that caused the failure of the first item has been resolved;

removing the incident node from the graph; and removing any edges connected to the incident node from the graph.

2. The method of claim 1, further comprising:

determining a first set of nodes corresponding to the one or more items that will fail;

identifying all nodes in the graph that are connected by an edge to the first set of nodes;

generating a second set of nodes comprising the nodes in the graph that are connected to the first set of nodes;

determining, by applying the one or more operational rules to each node of the second set of nodes, whether any items corresponding to the second set of nodes would fail because of the failure of the first item; and outputting one or more items corresponding to the second set of nodes that would fail because of the failure of the first item.

3. The method of claim 1, wherein the graph is a directed graph.

4. The method of claim 1, wherein the first item in the network is a hardware component or a software service.

5. The method of claim 1, wherein the information about the first item comprises:

a model number and a manufacturer of the first item, or a list of attributes of the first item.

6. The method of claim 1, wherein the first node comprises a type of the first item, a unique identifier corresponding to the first item, and one or more attributes of the first item.

7. The method of claim 1, wherein each edge indicates a type of service provided by the first node to the one or more second nodes and one or more attributes of the service.

8. The method of claim 1, wherein determining whether any items corresponding to the one or more second nodes would fail because of the failure of the first item comprises, for each node of the one or more second nodes:

determining a type of an item associated with the respective node;

retrieving, based on the type, one or more operational rules to be applied to the respective node; and applying the one or more operational rules to the respective node to determine whether the item associated with the respective node would continue operating after the first item has failed.

9. The method of claim 1, further comprising:

determining that the first item has failed; and re-routing traffic in the network away from the one or more items that would fail because of the failure of the first item.

10. A system comprising at least one processor and memory storing executable instructions which, when executed by the at least one processor, cause the system to:

receive information about a first item in a network, wherein the information comprises an identifier of the first item and an indication that the first item provides a service to one or more second items in the network;

retrieve a graph corresponding to the network;

determine whether any node in the graph corresponds to the identifier of the first item;

after determining that the graph does not contain any node corresponding to the identifier of the first item, add a first node to the graph corresponding to the first item in the network;

add one or more edges to the graph connecting the first node to one or more second nodes corresponding to the one or more second items, wherein each edge indicates that the first item provides the service to the one or more second items;

receive a request to model a failure of the first item;

retrieve the one or more second nodes that are connected to the first node by edges;

determine, by applying one or more operational rules to each of the one or more second nodes, whether any items corresponding to the one or more second nodes would fail because of the failure of the first item;

output one or more items that would fail because of the failure of the first item;

add an incident node to the graph;

add an edge to the graph connecting the incident node to the first node;

determine that an incident that caused the failure of the first item has been resolved;

remove the incident node from the graph; and remove any edges connected to the incident node from the graph.

11. The system of claim 10, wherein the executable instructions cause the system to:

determine that the first item has failed; and re-route traffic in the network away from the one or more items that would fail because of the failure of the first item.

12. The system of claim 10, wherein the executable instructions cause the system to:

determine a first set of nodes corresponding to the one or more items that will fail;

identify all nodes in the graph that are connected by an edge to the first set of nodes;

generate a second set of nodes comprising the nodes in the graph that are connected to the first set of nodes;

determine, by applying the one or more operational rules to each node of the second set of nodes, whether any items corresponding to the second set of nodes would fail because of the failure of the first item; and output one or more items corresponding to the second set of nodes that would fail because of the failure of the first item.

13. The system of claim 10, wherein:

the graph is a directed graph, the first item is a hardware component, and the information about the first item comprises a model number and a manufacturer of the first item.

14. A non-transitory computer-readable medium comprising executable instructions which, when executed by at least one processor, cause the at least one processor to:

receive information about a first item in a network, wherein the information comprises an identifier of the first item and an indication that the first item provides a service to one or more second items in the network;

retrieve a graph corresponding to the network;

determine whether any node in the graph corresponds to the identifier of the first item;

after determining that the graph does not contain any node corresponding to the identifier of the first item, add a first node to the graph corresponding to the first item in the network;

add one or more edges to the graph connecting the first node to one or more second nodes corresponding to the one or more second items, wherein each edge indicates that the first item provides the service to the one or more second items;

receive a request to model a failure of the first item;

retrieve the one or more second nodes that are connected to the first node by edges;

determine, by applying one or more operational rules to each of the one or more second nodes, whether any items corresponding to the one or more second nodes would fail because of the failure of the first item;

output one or more items that would fail because of the failure of the first item;

add an incident node to the graph;

add an edge to the graph connecting the incident node to the first node;

determine that an incident that caused the failure of the first item has been resolved;

remove the incident node from the graph; and remove any edges connected to the incident node from the graph.

15. The non-transitory computer-readable medium of claim 14, wherein the executable instructions cause the at least one processor to:

determine that the first item has failed; and re-route traffic in the network away from the one or more items that would fail because of the failure of the first item.

16. The non-transitory computer-readable medium of claim 14, wherein the executable instructions cause the at least one processor to:

determine a first set of nodes corresponding to the one or more items that will fail;

identify all nodes in the graph that are connected by an edge to the first set of nodes;

generate a second set of nodes comprising the nodes in the graph that are connected to the first set of nodes;

determine, by applying the one or more operational rules to each node of the second set of nodes, whether any items corresponding to the second set of nodes would fail because of the failure of the first item; and output one or more items corresponding to the second set of nodes that would fail because of the failure of the first item.

17. The non-transitory computer-readable medium of claim 14, wherein the graph is a directed graph.

18. The non-transitory computer-readable medium of claim 14, wherein the first item in the network is a hardware component or a software service.

19. The non-transitory computer-readable medium of claim 14, wherein the information about the first item comprises:

a model number and a manufacturer of the first item, or a list of attributes of the first item.

20. The non-transitory computer-readable medium of claim 14, wherein the first node comprises a type of the first item, a unique identifier corresponding to the first item, and one or more attributes of the first item.

\* \* \* \* \*